United States Patent Office 3,506,433
Patented Apr. 14, 1970

3,506,433
PLANT GROWTH CONTROL
Walter W. Abramitis, Downers Grove, and Richard A. Reck, Hinsdale, Ill., assignors, by mesne assignments, to Armour Industrial Chemical Company, a corporation of Delaware
No Drawing. Continuation-in-part of application Ser. No. 206,196, June 29, 1962. This application Oct. 20, 1965, Ser. No. 499,032
The portion of the term of the patent subsequent to Dec. 14, 1982, has been disclaimed
Int. Cl. A01n 5/00, 9/20
U.S. Cl. 71—78                    42 Claims

ABSTRACT OF THE DISCLOSURE

The control of undesirable secondary growth in plants with certain primary, secondary or tertiary amine salts.

---

This is a continuation-in-part of our copending application Ser. No. 206,196, filed June 29, 1962, now U.S. Patent No. 3,223,517.

This invention relates to plant growth control, and more particularly to the control of undesirable secondary growth in plants.

In various plants, such as, for example, tobacco, tomato, cotton, soybean plants, etc., undesirable secondary growth, which is generally referred to as "suckers," creates a serious problem because the suckers develop rapidly to shade desired portions of the plant and tend to ruin the quality of such desired portions. In the tobacco plant, secondary buds form at the points where the leaf stems join the plant, and later after the flower is removed grow rapidly to form sucker growths extending over the leaves. The sucker growths can be removed manually, but this is a laborious and expensive proceeding. The use of sucker oil and chemicals, while effective in control of such secondary growth, nevertheless have in the past had serious disadvantages. The sucker oil tends to form leaf and stalk damage, causing soft spots that are attacked by microbes, and also there is a lack of control of the lower sucker stalks. The chemicals which have previously been used produce cellular changes in the leaf, tending to reduce the filling capacity of the treated tobacco for cigarette manufacture. Further, the cost of the chemicals has been high.

Cotton plants are customarily defoliated prior to mechanical picking. Such defoliation tends to encourage undesirable secondary growth which presents difficulties in mechanical picking and which must be separated from the cotton following mechanical picking. In periods of adverse weather preventing mechanical picking for several days, the secondary growth induced in the cotton plant treated with a defoliation agent tends to overcome the advantages of the original defoliation.

We have discovered that the undesirable secondary growth of plants can be effectively controlled through the spray application of primary, secondary or tertiary amine salts without entailing the disadvantages described above. The primary, secondary or tertiary amine salts can be applied in a coarse stream to the stem or other portion of the plant to effect a complete control of such sucker growth without plant injury.

A primary object, therefore, of our invention is to provide a method for the treatment of plants for the control of undesirable secondary growth therein.

A further object is to provide for the control of undesirable secondary growth in tomato plants by applying to the plants control agents which prevent the secondary growth while at the same time avoiding injury to desirable portions of the plants.

A still further object is to provide for the control of undesirable secondary growth in soybean plants by applying to the plants control agents which prevent secondary growth while avoiding injury to desirable portions of the plants.

Another object is to provide for the control of undesirable secondary growth in cotton plants by applying to the plants control agents which prevent secondary growth while avoiding injury to desirable portions of the plants.

Other specific objects and advantages will appear as the specification proceeds.

In one embodiment of our invention, we apply to the plant primary, secondary or tertiary amine salts, including the organic and inorganic salts, in an aqueous solution or emulsion. For example, the amine salts may be applied in a coarse water spray directed to the stem of the plant, and such spray application is found to give effective control.

Such sucker control agents may be described by the following formula:

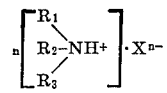

$R_1$ is an aliphatic hydrocarbon radical having from about 8 to 18 carbon atoms;
$R_2$ is selected from the group consisting of an aliphatic hydrocarbon radical having from about 8 to 18 carbon atoms, hydrogen, methyl, ethyl, ethoxy and propoxy;
$R_3$ is selected from the group consisting of hydrogen, methyl, ethyl, ethoxy and propoxy, provided that when $R_3$ is methyl, ethyl, ethoxy or propoxy $R_3$ is the same as $R_2$;
X is an anion; and
$n$ is an integer from 1 to 2 representing the number of acid functions neutralized.

The amine salts useful in our invention may be made by fully or partially neutralizing a mono or dibasic acid with a primary, secondary or tertiary amine.

The amomnium cation of the above formula is believed to be the effective sucker control agent and may be employed in combination with many anions. Examples are organic salts, such as acetates, levulinates, malonates, fumarates, tartarates, lactates, propionates, chloropropionates, succinates, phthalates, naphthenates, citrates, benzoates, etc., or inorganic salts, such as for example, nitrates, chlorides, sulfates, phosphates, etc. The free amines corresponding to the cationic portion of the above formula have shown effectiveness in control of secondary growth, but use of the salts is preferred due to greater effectiveness in control of secondary growth with lower phytotoxicity to the plants.

Specific examples illustrating the effectiveness and specific control methods may be set out as follows:

EXAMPLE I

At the time of topping 3–15 ml. aqueous solutions were applied to the top of the plant and allowed to run down the stalk. The field results were as follows:

FLUE-CURED TOBACCO

| Material | Conc., p.p.m. | Sucker control | Plant injury |
|---|---|---|---|
| Dodecyldimethyl- amine acetate. | 10 | 0 | None. |
|  | 100 | 0 | Do. |
|  | 1,000 | Slight | Do. |
|  | 10,000 | 100% | Do. |
| Dodecylmethyl- amine acetate. | 10 | 0 | Do. |
|  | 100 | 0 | Do. |
|  | 1,000 | 0 | Do. |
|  | 10,000 | Satisfactory (85%) | |

EXAMPLE II

The method of application described in Example I was carried out on burley tobacco, and the field results were as follows:

BURLEY TOBACCO

| Material | Conc., p.p.m. | Sucker control | Plant injury |
|---|---|---|---|
| Dodecyldimethyl- amine acetate. | 5,000 | Satisfactory | None. |
|  | 10,000 | 100% | Slight. |
|  | 20,000 | 100% | Some stem girdling at ground level. |
| Dodecylmethyl- amine acetate. | 5,000 | 25% | None. |
|  | 10,000 | 50%-100% | Do. |
|  | 20,000 | Satisfactory (85%) | Do. |

EXAMPLE III

A series of salts of cocodimethylamine were prepared and tested in the greenhouse for tobacco sucker control. At the time of flowering, the plants were topped and given an overall spray (20 ml. each). The concentrations of the treating salt varied between 0.125% and 0.5%. The effect at the different concentrations was observed at weekly intervals. The results were as follows:

Cocodimethylamine acetate at a concentration of 0.125% gave no sucker growth after a week but a slight sucker growth after two weeks. At a concentration of 0.5%, there was no sucker growth over a three-week interval.

Cocodimethylamine levulinate at concentrations of 0.125% and 0.25% gave no sucker growth after a week, but a slight growth after two weeks. At a concentration of 0.5%, there was no sucker growth observed over a three-week period.

Cocodimethylamine malonate disalt at concentrations of 0.125% and at 0.25% gave no sucker growth after a week, but slight growth after two weeks. At a concentration of 0.5%, there was no sucker growth observed over a three-week period.

Cocodimethylamine phthalate disalt, at concentrations of 0.125% and 0.25% resulted in no sucker growth after a week's interval, and a slight growth after a two-week interval. At a concentration of 0.5%, there was no growth over a period of three weeks.

Cocodimethylamine succinate-disalt produced no sucker growth for a week following treatment, but a slight growth after two weeks. At a concentration of 0.5%, there was no growth observed during a three-week interval.

Cocodimethylamine naphthenate at concentrations of 0.125% and 0.25% gave slight sucker growth during one and two-week intervals, but at a concentration of 0.5%, there was no growth observed for the first two weeks after treatment and a slight growth observed after three weeks following treatment.

Cocodimethylamine nitrate at concentrations of 0.125% and .25% resulted in slight sucker growth during the first and second week intervals, but at a concentration of 0.5%, permitted no sucker growth over a three-week period.

Cocodimethylamine hydrochloride, at concentrations of 0.125% and .25%, resulted in no sucker growth during the first week following treatment and slight growth at the end of the second week, but at a concentration of 0.5%, permitted no growth during a period of three weeks.

The untreated tobacco plant employed as a control in the above tests produced well-developed secondary shoots which were observed at each weekly inspection.

In the foregoing tests, no plant injury was observed.

EXAMPLE IV

Flowering tobacco plants were topped and large suckers removed. The test plants were each sprayed with 20 ml. of an aqueous solution containing 150 mg. of the active chemical. The spray was directed toward the stem. Twenty-one days following treatment the plants were observed and the following results obtained.

| Chemical | Sum of 2 plants, suckers | | Percent sucker control on basis of green weight | Plant injury |
|---|---|---|---|---|
| | Number | Green weight, grams | | |
| Cocodimethylamine α-chloropropionate. | 4 | 39.2 | 84.8 | None. |
| Soya (polyoxyethylene-5 moles) tertiary amine α-chloropropionate. | 10 | 81.2 | 68.5 | Do. |
| Cocodimethylamine β-chloropropionate. | 2 | 16.7 | 93.5 | Do. |
| Coco-(polyoxyethylene-5 moles) tertiary amine succinate monosalt. | 8 | 65.5 | 74.6 | Do. |
| Oleyldimethylamine succinate monosalt. | 6 | 125.7 | 51.3 | Do. |
| Soya (polyoxyethylene-5 moles) tertiary amine isophthalate disalt. | 10 | 94.6 | 63.3 | Do. |
| Cocodimethylamine fumarate disalt. | 3 | 16.1 | 93.5 | Do. |
| Control—No treatment | 10 | 258.0 | | |

The term "polyoxyethylene-5 moles" refers to the adduct of 5 moles ethylene oxide per mole of amine.

EXAMPLE V

Flowering Hicks tobacco plants were topped and the large suckers removed from the plant. The plants were each sprayed with 1.25 ml. of an aqueous solution containing 2500 p.p.m. of active chemical. The plants were observed 13 days following application of the chemical.

| Chemical | Suckers | Plant injury |
|---|---|---|
| Cocodimethylamine dimethyldithiocarbamate. | None | None. |
| Cocodimethylamine diethyldithiocarbamate. | do | Slight to top leaves. |
| Control—no chemical | 3 large | |

EXAMPLE VI

Tobacco plants were each sprayed with 20 ml. of an aqueous solution containing active chemical as indicated and 1% wetting agent (Tween-20). Four plants were sprayed with each chemical and observed after fourteen days. The percent control is the percent by which treatment reduced sucker green weight compared to untreated controls.

| Chemical | Rate/plant (mg.) | Tobacco type | Percent control | Plant injury |
|---|---|---|---|---|
| $C_{7-9}$ sec. alkyl primary amine acetate. | 100 | Burley | 69.1 | Very slight necrotic spots. |
| $C_{11-15}$ sec. alkyl primary amine acetate. | 100 | Connecticut Broadleaf | 100 | Moderate necrotic spots. |
| $C_{11-15}$ sec. alkyl dimethyl amine acetate. | 100 | Burley | 99.1 | Do. |
| $C_{11-15}$ sec. alkyl dimethyl amine oleate. | 100 | do | 100 | Leaves normal. |
| $C_{11-15}$ sec. alkyl dimethyl amine oleate. | 100 | Connecticut Broadleaf | 100 | Do. |
| $C_{11-15}$ sec. alkyl dimethyl amine oleate. | 50 | Hicks Flue-Cured | 97 | Do. |
| $C_{11-15}$ sec. alkyl dimethyl amine oleate. | 100 | do | 100 | Do. |
| $C_{11-15}$ sec. alkyl dimethyl amine oleate. | 150 | do | 100 | Leaves generally normal. |
| $C_{15-20}$ sec. alkyl primary amine oleate. | 100 | Connecticut Broadleaf | 100 | Moderate necrotic spots. |
| Cocodimethylamine chloropropionate. | 100 | do | 100 | Slight necrotic spots. |

$C_{7,9}$ sec.-alkyl primary amine referes to amines obtained by the amidation of olefins as described in the pending application Ser. No. 397,287, filed Sept. 17, 1964.

EXAMPLE VII

Cotton plants were sprayed until thoroughly wet with 20 milliliters or less of aqueous solutions of the below tablulated chemicals. The plants were observed for subsequent secondary growth sixteen days following spray application of the chemicals.

| Chemical | Conc., p.p.m. | Presence of suckers |
|---|---|---|
| Control (2 plants) | | Moderate. |
| Cocodimethylamine succinate monosalt | 500 | None. |
| Coco-(polyoxyethylene-2 moles) tertiary amine succinate monosalt. | 1,000 | Do. |
| $C_{11}$-$C_{15}$ sec.-alkyl primary amine succinate disalt. | 1,000 | Do. |
| $C_{11}$-$C_{15}$ sec.-alkyl primary amine citrate monosalt. | 1,000 | Do. |
| $C_{11}$-$C_{15}$ sec.-alkyl primary amine citrate disalt. | 1,000 | Do. |
| $C_{11}$-$C_{15}$ sec.-alkyl primary amine tartrate disalt. | 1,000 | Do. |
| Coco-(polyoxyethylene-5 moles) tertiary amine succinate disalt. | 1,000 | Do. |

EXAMPLE VIII

Soybean plants were sprayed until thoroughly wet with 20 milliliters or less of aqueous solutions of the below tabulated chemicals. The plants were observed for subsequent secondary growth fourteen days following spray application of the chemicals.

| Chemical | Conc., p.p.m. | Presence of suckers |
|---|---|---|
| Control (10-12 plants) | | Moderate. |
| Dodecyldimethylamine succinate monosalt | 500 | Do. |
| Do | 1,000 | Few, None. |
| Cocodimethylamine α chloropropionate | 500 | Moderate. |
| Do | 1,000 | One. |
| Dodecyldimethylamine β chloropropionate | 500 | Few. |
| Do | 1,000 | Few. |
| Soya-ethoxylated 5 moles-tertiary amine α chloropropionate. | 500 | Few. |
| Do | 1,000 | None. |
| Tallow-ethoxylated 5 moles-tertiary amine succinate monosalt. | 1,000 | Do. |
| Coco-ethoxylated 5 moles-tertiary amine succinate disalt. | 1,000 | Do. |
| Oleyldimethylamine succinate monosalt | 1,000 | Do. |
| Hexadecyldimethylamine succinate monosalt | 1,000 | Do. |
| Cocodimethylamine tartarate monosalt | 1,000 | Do. |
| Cocodimethylamine lactate | 1,000 | One. |
| Oleylamine succinate disalt | 1,000 | None. |
| Tallowamine succinate monosalt | 1,000 | Do. |
| $C_{11}$-$C_{15}$ secondary alkyl primary amine citrate disalt. | 1,000 | Do. |
| $C_{11}$-$C_{15}$ secondary alkyl primary amine succinate disalt. | 1,000 | Very few. |

EXAMPLE IX

Tomato plants were sprayed until thoroughly wet with 20 milliliters or less of aqueous solutions of the below tabulated chemicals. The plants were observed for subsequent secondary growth sixteen days following spray application of the chemicals.

| Chemical | Conc., p.p.m. | Presence of suckers |
|---|---|---|
| Control (10-12 plants) | | Moderate to many. |
| Dodecyldimethylamine succinate monosalt | 500 | None. |
| Do | 1,000 | Do. |
| Cocodimethylamine citrate monosalt | 500 | Few. |
| Do | 1,000 | None. |
| Oleylamine succinate monosalt | 500 | Few. |
| Do | 1,000 | None. |
| Cocodimethylamine maleate monosalt | 500 | Moderate. |
| Do | 1,000 | Few. |
| Cocodimethylamine β-chloropropionate | 500 | Few. |
| Do | 1,000 | Few. |
| Cocodimethylamine naphthenate | 500 | Few. |
| Do | 1,000 | None. |
| Cocodimethylamine succinate monosalt | 500 | Few, Small. |
| Cocopolyethoxylated-2 moles-amine succinate monosalt. | 500 | Moderate, Small. |
| Do | 1,000 | Few, Small. |
| Soyapolyethoxylated -5 moles-amine α-chloropropionate. | 500 | None. |

The concentration range of the particular active chemical used may vary widely depending upon various conditions, the type of plant being treated, age of the plant, etc. Generally, we find it suitable to use a concentration within the range of from about 0.01 to 10% which is effective for the control of undesirable secondary growth while at the same time avoiding plant injury, and best results have been obtained using concentrations of from about 0.05 to 1.0%.

Any suitable method of application of the active agent may be employed. We prefer to employ an aqueous solution and to direct the same onto the upper portion of the plant. For some purposes, an emulsion may be desired, and such an emulsion may be prepared by combining the chemical agents in a carrier using an emulsifier. By way of example, from 3-5% of Ethofat 60/15 (stearic acid containing 5 moles of ethylene oxide) may be combined with the agent and water to form an emulsion. Since the growth control compound is generally water soluble, the use of an equeous spray for most purposes will be preferred. Oil solutions or emulsions may be used in instances wherein the oil itself does not give rise to disadvantages. For example, oil has a deleterious effect upon desirable portions of tobacco plants.

While the foregoing specification has set out treating ingredients and procedural steps in considerable detail for the purpose of illustrating our invention, it will be understood that such detail or details may be varied by those skilled in the art without departing from the spirit of our invention.

We claim:

1. A method for treating growing cotton plants to control undesirable secondary growth therein without producing injury to desired portions of said plants, comprising applying to the plants an amine salt within the formula

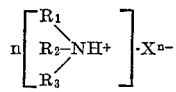

R₁ is an aliphatic hydrocarbon radical having from about 8 to 18 carbon atoms,

R₂ is selected from the group consisting of an aliphatic hydrocarbon radical having from about 8 to 18 carbon atoms, hydrogen, methyl, ethyl, ethoxy and propoxy, R₃ is selected from the group consisting of hydrogen, methyl, ethyl, ethoxy, and propoxy, provided that when R₃ is methyl, ethyl, ethoxy or propoxy R₃ is the same as R₂, X is the anionic portion of an acid selected from the group consisting of inorganic and organic acids, and n is an integer from 1 to 2 representing the number of acid functions neutralized;

said salt being applied in an amount effective to attain said control.

2. The method of claim 1 in which said aliphatic hydrocarbon radical is an alkyl radical.

3. The method of claim 1 in which the amine salt is applied in an aqueous solution.

4. The method of claim 1 in which the amine salt is applied in an oil solution.

5. The method of claim 1 in which the amine salt is applied as an emulsion.

6. The method of claim 1 in which the amine salt is dodecyldimethylamine acetate.

7. The method of claim 1 in which the amine salt is dodecylmethylamine acetate.

8. The method of claim 1 in which the amine salt is cocodimethylamine succinate mono-salt.

9. The method of claim 1 in which the amine salt is cocodimethylamine succinate disalt.

10. The method of claim 1 in which the amine salt is dodecyldimethylamine succinate monosalt.

11. The method of claim 1 in which the amine salt is cocodimethylamine chloropropionate.

12. The method of claim 1 in which the amine salt is cocodimethylamine fumarate.

13. A method for treating growing plants to control undesirable secondary growth without producing injury to desired portions of the plants, comprising applying to the plants an amine salt selected from the group consisting of oleylamine succinate, $C_{11}$–$C_{15}$ secondary-alkyl primary amine oleate, and $C_{11}$–$C_{15}$ secondary-alkyl primary amine citrate.

14. A method for treating growing plants to control undesirable secondary growth therein without producing injury to desired portions of the plants, comprising applying to the plants an amine salt within the formula

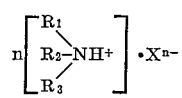

R₁ is an aliphatic hydrocarbon radical having from about 8 to 18 carbon atoms,

R₂ is selected from the group consisting of an ethoxy and propoxy,

R₃ is selected from the group consisting of ethoxy and propoxy, provided that R₃ is the same group as R₂

X is the anionic portion of an acid selected from the group consisting of inorganic and organic acids, and n is an integer from 1 to 2 representing the number of acid functions neutralized;

said salt being applied in an amount effective to attain said control.

15. The method of claim 14 wherein said plants are tobacco plants.

16. A method for treating growing soybean plants to control undesirable secondary growth therein without producing injury to desired portions of said plants, comprising applying to the plants an amine salt within the formula

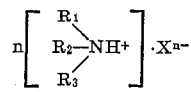

R₁ is an aliphatic hydrocarbon radical having from about 8 to 18 carbon atoms,

R₂ is selected from the group consisting of an aliphatic hydrocarbon radical having from about 8 to 18 carbon atoms, hydrogen, methyl, ethyl, ethoxy and propoxy, R₃ is selected from the group consisting of hydrogen, methyl, ethyl, ethoxy and propoxy, provided that when R₃ is methyl, ethyl, ethoxy or propoxy R₃ is the same as R₂, X is the anionic portion of an acid selected from the group consisting of inorganic and organic acids, and n is an integer from 1 to 2 representing the number of acid functions neutralized;

said salt being applied in an amount effective to attain said control.

17. The method of claim 16 in which said aliphatic hydrocarbon radical is an alkyl radical.

18. The method of claim 16 in which the amine salt is applied in an aqueous solution.

19. The method of claim 16 in which the amine salt is applied in an oil solution.

20. The method of claim 16 in which the amine salt is applied as an emulsion.

21. The method of claim 16 in which the amine salt is dodecyldimethylamine acetate.

22. The method of claim 16 in which the amine salt is dodecylmethylamine acetate.

23. The method of claim 16 in which the amine salt is cocodimethylamine succinate mono-salt.

24. The method of claim 16 in which the amint salt is cocodimethylamine succinate disalt.

25. The method of claim 16 in which the amine salt is dodecyldimethylamine succinate mono-salt.

26. The method of claim 16 in which the amine salt is cocodimethylamine chloropropionate.

27. The method of claim 16 in which the amine salt is cocodimethylamine fumarate.

28. A method for treating growing tomato plants to control undesirable secondary growth therein without producing injury to desired portions of salt plants, comprising applying to the plants an amine salt within the formula

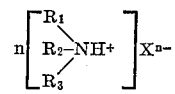

R₁ is an aliphatic hydrocarbon radical having from about 8 to 18 carbon atoms.

R₂ is selected from the group consisting of an aliphatic hydrocarbon radical having from about 8 to 18 carbon atoms, hydrogen, methyl, ethyl, ethoxy and propoxy, R₃ is selected from the group consisting of hydrogen, methyl, ethyl, ethoxy and propoxy, provided that when R₃ is methyl, ethyl, ethoxy or propoxy R₃ is the same as R₂, X is the anionic portion of an acid selected from the group consisting of inorganic and organic acids, and n is an integer from 1 to 2 representing the number of acid functions neutralized;

said salt being applied in an amount effective to attain said control.

29. The method of claim 28 in which said aliphatic hydrocarbon radical is an alkyl radical.

30. The method of claim 28 in which the amine salt is applied in an aqueous solution.

31. The method of claim 28 in which the amine salt is applied in an oil solution.

32. The method of claim 28 in which the amine salt is applied as an emulsion.

33. The method of claim 28 in which the amine salt is dodecyldimethylamine acetate.

34. The method of claim 28 in which the amine salt is dodecylmethylamine acetate.

35. The method of claim 28 in which the amine salt is cocodimethylamine succinate mono-salt.

36. The method of claim 28 in which the amine salt is cocodimethylamine succinate disalt.

37. The method of claim 28 in which the amine salt is dodecyldimethylamine succinate mono-salt.

38. The method of claim 28 in which the amine salt is cocodimethylamine chloropropionate.

39. The method of claim 28 in which the amine salt is cocodimethylamine fumarate.

40. The method of claim 14 wherein said plants are tomato plants.

41. The method of claim 14 wherein said plants are soybean plants.

42. The method of claim 14 wherein said plants are cotton plants.

References Cited

UNITED STATES PATENTS

| | | | |
|---|---|---|---|
| 2,751,713 | 6/1956 | Abramitis | 71—2.7 X |
| 2,970,048 | 1/1961 | Hamm et al. | 71—2.5 |
| 3,156,555 | 11/1964 | Tolbert | 71—2.7 |
| 3,223,517 | 12/1965 | Abramitis et al. | 71—2.7 |

OTHER REFERENCES

Plant Regulators Publication 384, CBCC Positive Data Series No. 2, June 1955, pp. b, c, 1, 14 and 15.

JAMES O. THOMAS, Jr., Primary Examiner

U.S. Cl. X.R.

71—121